United States Patent
Andrews Hoegg (10) Patent No.: US 8,853,881 B2
(45) Date of Patent: Oct. 7, 2014

(54) SPLIT VENTURI RING MAGLEV GENERATOR TURBINE

(76) Inventor: Steven James Andrews Hoegg, Guatemala (GT)

(*) Notice: Subject to any disclaimer, the term of this patent is extended or adjusted under 35 U.S.C. 154(b) by 0 days.

(21) Appl. No.: 13/442,105

(22) Filed: Apr. 9, 2012

(65) Prior Publication Data
US 2013/0266429 A1    Oct. 10, 2013

(51) Int. Cl.
*F03D 1/00* (2006.01)

(52) U.S. Cl.
USPC .................................................. 290/55

(58) Field of Classification Search
USPC .................................................. 290/44, 55
See application file for complete search history.

(56) References Cited

U.S. PATENT DOCUMENTS

| | | | |
|---|---|---|---|
| 4,547,124 A | | 10/1985 | Kliatzkin et al. |
| 4,720,640 A | * | 1/1988 | Anderson et al. ............. 290/43 |
| 5,670,746 A | * | 9/1997 | Hashimoto et al. ........... 174/651 |
| 5,722,326 A | | 3/1998 | Post |
| 5,844,341 A | | 12/1998 | Spooner et al. |
| 6,020,665 A | * | 2/2000 | Maurio et al. ............... 310/90.5 |
| 6,049,148 A | * | 4/2000 | Nichols et al. .............. 310/68 B |
| 6,664,880 B2 | | 12/2003 | Post |
| 6,700,216 B1 | * | 3/2004 | Vann ............................... 290/44 |
| 6,758,146 B2 | | 7/2004 | Post |
| 7,417,334 B2 | * | 8/2008 | Uchiyama ...................... 290/55 |
| 7,471,009 B2 | * | 12/2008 | Davis et al. ..................... 290/54 |
| 7,964,978 B1 | | 6/2011 | Weissmann |
| 2005/0204948 A1 | | 9/2005 | Post |
| 2008/0007070 A1 | * | 1/2008 | Edelson .......................... 290/55 |
| 2010/0111689 A1 | * | 5/2010 | Davis ............................ 415/229 |
| 2010/0329870 A1 | * | 12/2010 | Farb ............................. 416/179 |
| 2011/0031760 A1 | * | 2/2011 | Lugg .............................. 290/55 |
| 2011/0037265 A1 | * | 2/2011 | Fielder ........................... 290/52 |
| 2011/0110770 A1 | * | 5/2011 | Spooner et al. ............. 415/173.1 |
| 2012/0099977 A1 | * | 4/2012 | Churchill et al. ............. 415/185 |
| 2012/0261925 A1 | * | 10/2012 | Merlini et al. .................. 290/55 |
| 2013/0043685 A1 | * | 2/2013 | Sireli et al. ..................... 290/54 |

FOREIGN PATENT DOCUMENTS

| | | |
|---|---|---|
| DE | 3339462 A * | 5/1984 |
| EP | 1033477 A2 * | 9/2000 |

OTHER PUBLICATIONS

Ohya et al., "A Shrouded Wind Turbine Generating High Output Power with Wind-lens Technology," Energies 2010, 3, 634-649 (accessible via http://www.mdpi.com/1996-1073/3/4/634/pdf).

(Continued)

*Primary Examiner* — Joseph Waks
(74) *Attorney, Agent, or Firm* — Venable LLP; Henry J. Daley; F. Brock Riggs (57) ABSTRACT

A turbine assembly includes a split venturi shroud with two halves in hinged engagement about a vertical hinge axis that bisects the venturi shroud, a split clam jacket with two halves each attached to one of the two halves of the venturi shroud, and a rotor ring including an outer rim and a plurality of propeller blades within the outer rim. The rotor ring and venturi shroud are a rotor and a stator, respectively, of the turbine assembly. The venturi shroud is mountable on a support structure by transitioning from a folded state to an unfolded state. The clam jacket is open when the venturi shroud is folded and closed when the venturi shroud is unfolded, at least a portion of the support structure is surrounded by the clam jacket when in the unfolded state. The rotor ring can be mounted on the venturi shroud.

18 Claims, 10 Drawing Sheets

(56) References Cited

OTHER PUBLICATIONS

Ovidiu Sandru, "Wind Lens: A Futuristic Approach for Wind Power Coming from Japan," The Green Optimistic, http://www.greenoptimistic.com/2010/08/07/wind-lens-turbine/, Feb. 19, 2014.

"There is a never-ending source of energy that is free and in plentiful supply: wind." Sterling Wind Power, http://www.all-natural-energy.com/ (retrieved from http://web.archive.org/web/20110913053913/http://www.all-natural-energy.com/).

* cited by examiner

SPLIT VENTURI RING MAGLEV GENERATOR TURBINE

FIELD OF INVENTION

A hydro/aero-electric turbine, and in particular, an improved hydro/aero turbine with a split venturi effect shroud and an annular ring generator.

BACKGROUND

There is currently a global concern surrounding both the depletion and the increasing cost of oil. Another concern has been the use of potable water to produce the electricity. Wind power is one of the few options that uses no water resources to produce electricity.

U.S. Pat. No. 7,964,978 discloses a wind turbine having a blade ring that uses magnetic levitation. Specifically, this reference describes a wind turbine with a ring-encased propeller with a magnetic levitating bearing and generator in one unit. However, the "blade ring" has a simple round cross section.

U.S. Pat. Nos. 5,722,326, 6,664,880, and 6,758,146 and U.S. Patent Application Publication 2005/0204948 describe the Inductrack system. The Inductrack system uses a type of Halbach arrangement and induces electricity and magnetic fields as components of the system pass over each other.

U.S. Pat. No. 4,547,124 discloses the Winflex system, which uses an inflatable ring. Specifically, the Winflex Inflatable Light Flexible Wind Turbine is a wind turbine propeller encased in a flexible, inflatable ring with light-weight propeller blades. However, the Winflex system has a central shaft and a conventional generator, gearbox, and nacelle. In high winds the Winflex propeller can sustain great damage as it is not supported from behind and the inflatable ring is flexible and very light weight and may be blown away.

The Windtronics "Blade Tip Power System," now sold under Honeywell, is disclosed in U.S. Pat. No. 5,844,341. The wind turbine has a permanent magnet generator around a perimeter in an annular shroud encasing a propeller that has no shaft or gearbox.

The "Wind Lens Turbine" of Dr. Yuji Ohya (see http://www.greenoptimistic.com/2010/08/07/wind-lens-turbine/ and http://www.mdpi.com/1996-1073/3/4/634/pdf) and the "Vortec 7" and "Jet Accelerated Wind Turbine" of Sterling (see www.All-Natural-Energy.com) attempt an aerodynamically improved ring with an open propeller fitted into the opening. However, these designs are not split in two sections, nor are they attached to a central split jacket column. In addition, the ring is not a generator on these systems, nor is it suspended in a maglev bearing. Conventional propellers that fit inside the opening are used.

U.S. Pat. No. 6,700,216 describes a magnetically levitated windmill supported by an arched bottom and a top section of coils with electromagnetic generators which can be activated progressively to maximize power output.

Current wind turbines need a high wind speed to start rotating, are plagued with maintenance problems, are difficult to deploy and may experience blade fractures because of the continuously growing sizes, which result in costlier manufacturing, transport, installation and operation, so it is an object of this invention to provide a turbine with improved features as a new means of energy supply in a small or a grid scale.

SUMMARY

A turbine assembly according to an embodiment includes a split venturi shroud having two halves in hinged engagement about a vertical hinge axis that bisects the venturi shroud, a split clam jacket having two halves each attached to one of the two halves of the venturi shroud, and a rotor ring comprising an outer rim and a plurality of propeller blades within the outer rim. The venturi shroud is a stator of the turbine assembly and is mountable on a support structure by being transitioned from a folded state to an unfolded state. The clam jacket is open when the venturi shroud is in the folded state and closed when the venturi shroud is in the unfolded state. At least a portion of the support structure may be surrounded by the clam jacket when in the unfolded state. The rotor ring is a rotor of the turbine assembly, and can be mounted on the venturi shroud.

A method mounting a turbine assembly on a support structure according to an embodiment includes supplying a split venturi shroud that is folded at a hinge connecting two halves of the venturi shroud, where the venturi shroud includes a stator ring and a split clam jacket having two halves that are each attached to a mating face of one of the two halves of the venturi shroud. The clam jacket is open when the venturi shroud is folded. The method also includes positioning the venturi shroud such that the clam jacket is substantially parallel and proximal to the support structure, unfolding the venturi shroud such that the claim jacket closes around the support structure, and mounting a rotor ring on the venturi shroud. The rotor ring has a rotor portion.

BRIEF DESCRIPTION OF THE DRAWINGS

Further objectives and advantages will become apparent from a consideration of the description, drawings, and examples.

In all the drawings the different parts are designated with the same letter, indicated as follows:
A=PROPELLER
B=TENSION RING
C=STATOR/VENTURI SHROUD
D=SPLIT VENTURI RING SHROUD
E=ROTOR WITH DOUBLE HALBACH ARRAYS
F=LATERAL SUPPORTS
F=RINGED FLANGE ON STATOR
G=SPLIT CLAM JACKET
H=CENTRAL STRUCTURAL COLUMN OR CABLE
I=TUBULAR TOWER WITH ROLLERS
J=FOUNDATION
K=MOTORIZED ROLLERS
L=FOUNDATION AND ROTATION AXIS
M=REAR AND SIDE TUBULAR STRUCTURAL SUPPORT TOWERS
N=UPPER TENSION RING
O=CLAM ROTATION AND ELEVATION BOX
P=INNER ROTATION ROLLERS
Q=INNER ELEVATION ROLLERS
R=ROTATION MOTOR
S=ELEVATION MOTOR
T=CLAM JACKET HINGES
U=TENSION CABLE
V=PERMANENT MAGNETS HALBACH
W=RING CHANNEL IN ROTOR

DETAILED DESCRIPTION

An embodiment of the present invention provides a hydro/aero-electric turbine system 100 comprising a surrounding shroud 102 which, because of its form, accelerates the fluid flow through it by creating a low pressure zone behind the system, with a narrow throat upstream and a wider, expanding throat downstream, which accelerates the air through the propeller, boosting the power output.

Figures 1, 2:
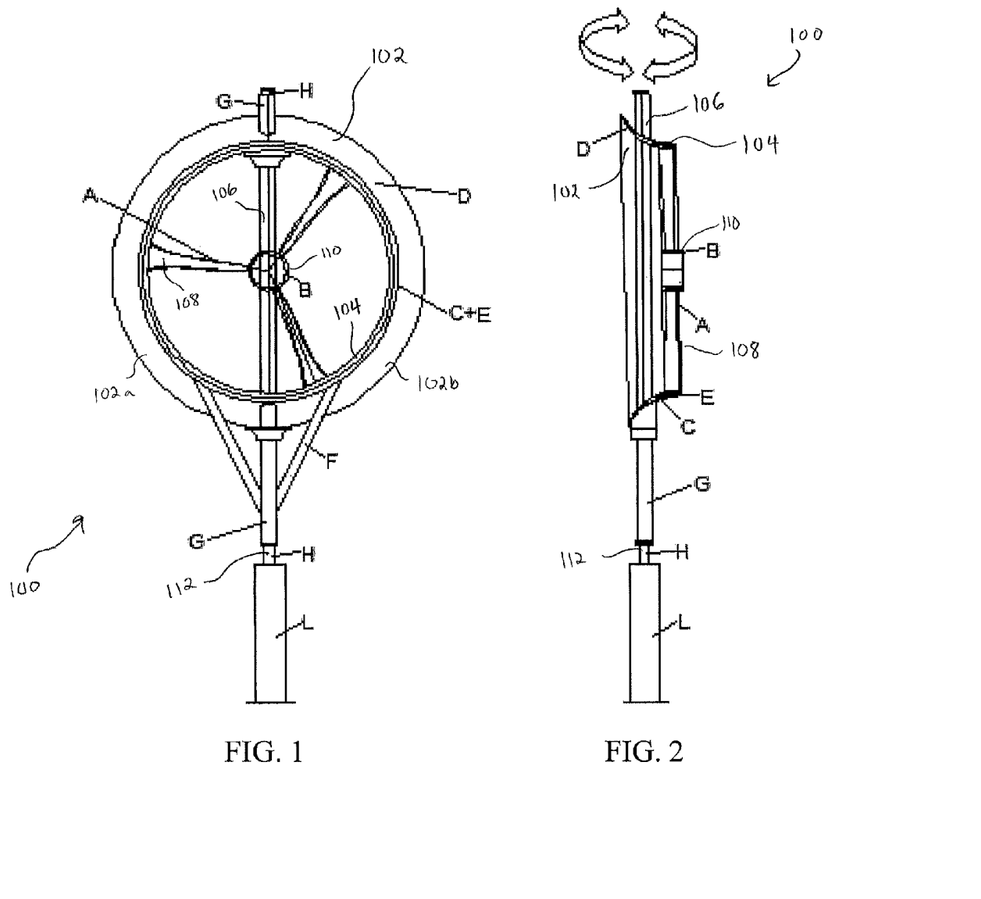
FIG. 1 shows a front view of a turbine assembly according to an embodiment of the present invention.
FIG. 2 shows a cross-sectional side view of a turbine assembly according to an embodiment of the present invention.
Figure 3:
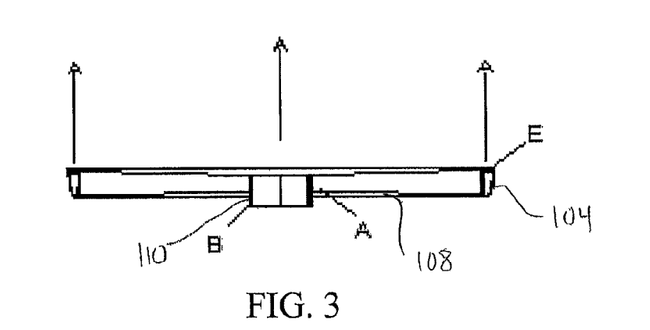
FIG. 3 shows a cross-sectional plan view of a rotor ring according to an embodiment of the present invention.
Figure 4:
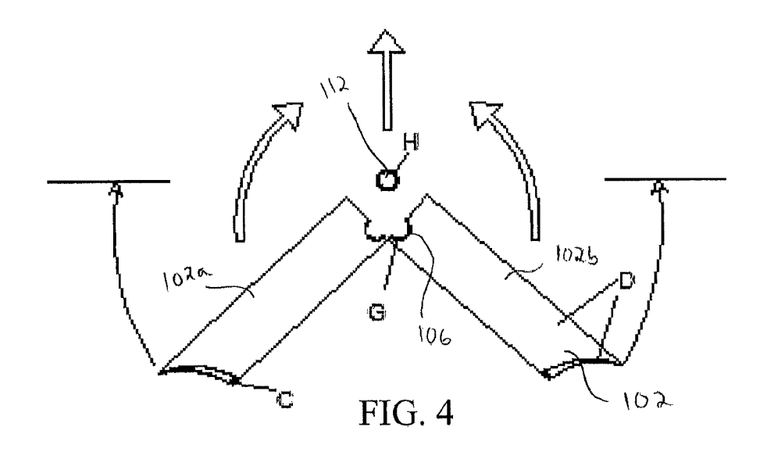
FIG. 4 shows plan view of a venturi ring folded at a vertical hinge according to an embodiment of the present invention.
Figure 5:
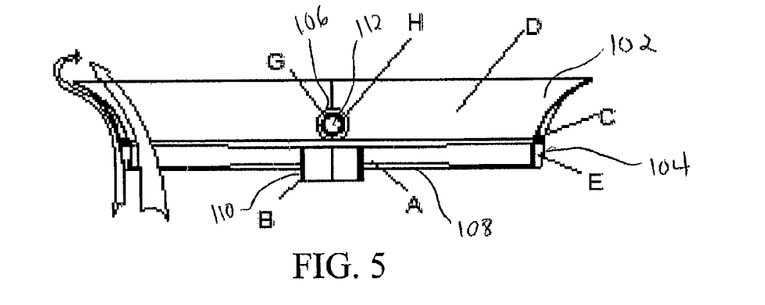
FIG. 5 shows a plan view of a turbine assembly with a rotor ring and a venturi ring assembled on a structure, and illustrates the fluid flow through and around the assembly according to an embodiment of the present invention.
Figure 8:
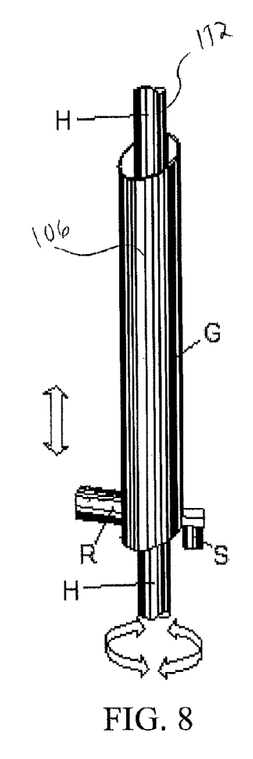
FIG. 8 shows a split claim jacket closed around a central support, and having elevator and rotation motors according to an embodiment of the present invention.
Figure 9:
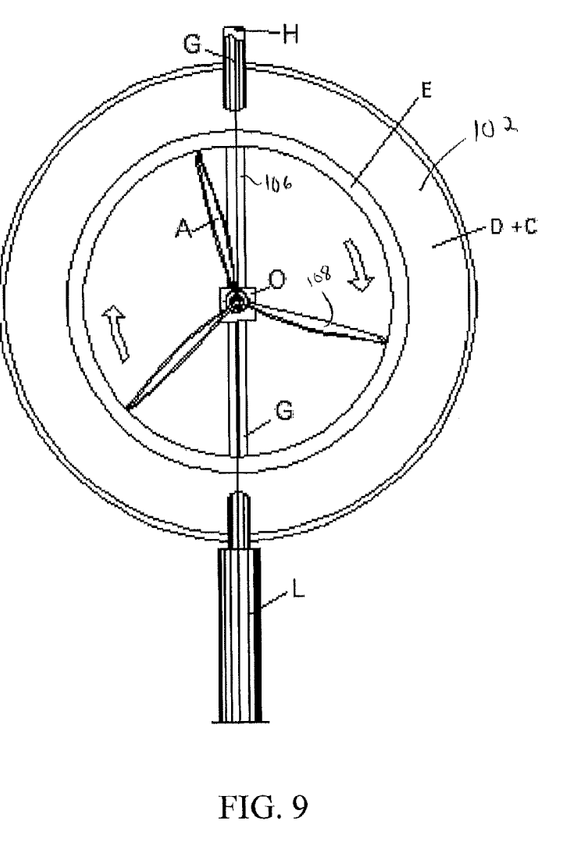
FIG. 9 shows a front view of a turbine assembly according to an embodiment of the present invention.
Figure 10:
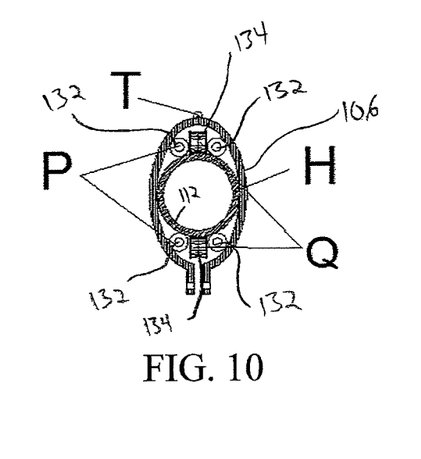
FIG. 10 shows a cross-sectional plan view of a split claim jacket closed around a support with internal rollers and hinges according to an embodiment of the present invention.
Figure 11:
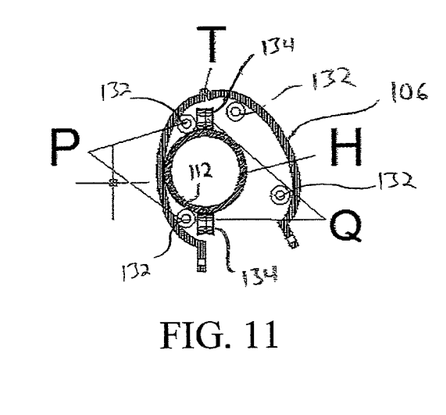
FIG. 11 shows a cross-sectional plan view of a partially opened split claim jacket around a support with internal rollers and hinges according to an embodiment of the present invention.
Figure 12:
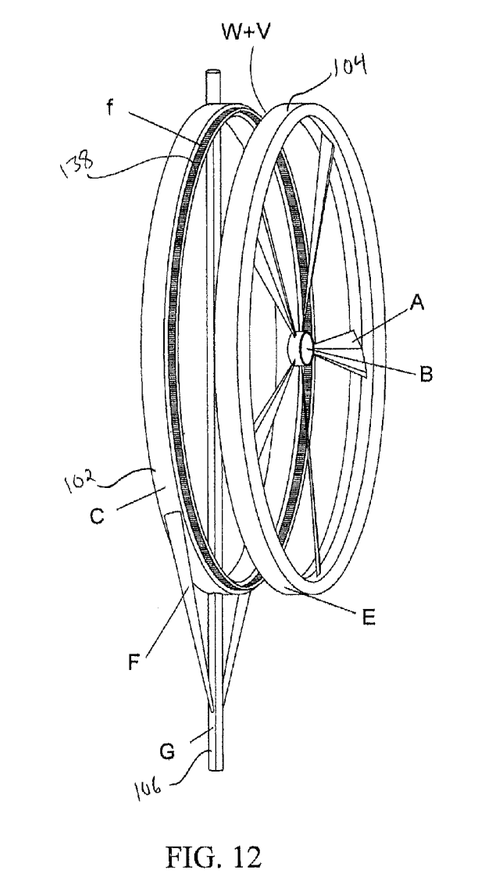
FIG. 12 shows an exploded, isometric view of a turbine assembly in which a rotor is separated from the venturi ring, exposing a portion of a stator of the assembly according to an embodiment of the present invention.
Figure 13:
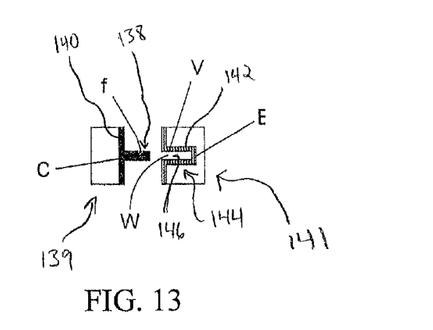
FIG. 13 shows a portion of a stator and a rotor in section according to an embodiment of the present invention.
Figure 14:
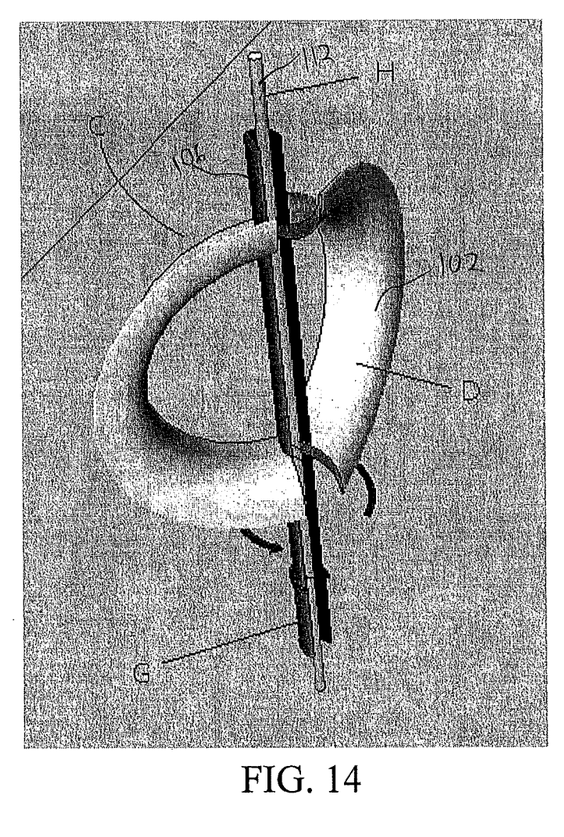
FIG. 14 shows an isometric, rear view of a turbine assembly according to an embodiment of the present invention, where a venturi ring and split clam jacket are open around a central support.
Figure 15:
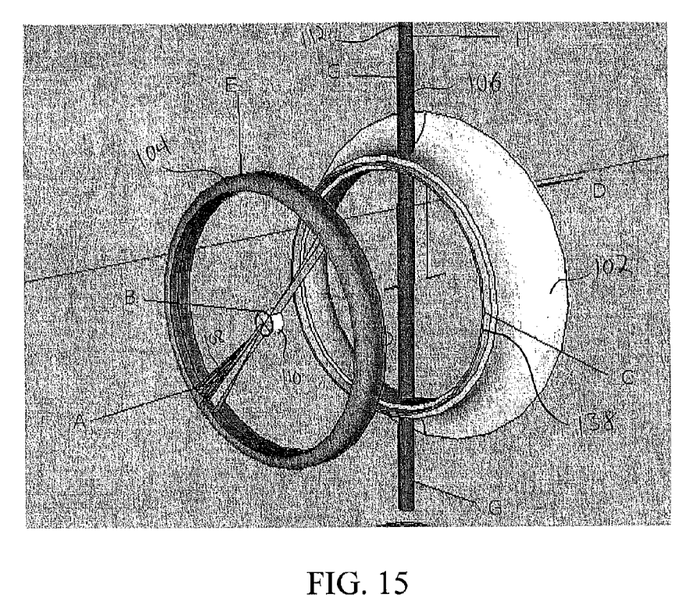
FIG. 15 shows an isometric, front view of a turbine assembly according to an embodiment of the present invention, where a venturi ring and split clam jacket are closed around a central support, and a rotor ring is shown exploded from the venturi ring.

The turbine 100 has a propeller 108 encased in a hydro/aero-dynamically improved "venturi ring" 102 that accelerates the fluid through it and boosts power generation by a major factor. The "venturi ring" shroud 102 is split in two halves 102a and 102b and is attached to a central split column jacket 106 which can be set over a column or other vertical structure 112 (see FIGS. 3-5) and which can rotate to face the fluid flow (see, for example, FIGS. 2 and 8). The venturi shroud 102 can be folded for easier transport and deployment.

The ring may be in itself a generator and a maglev bearing around the perimeter, which constitutes the direct drive permanent magnet generator and the magnetic bearing, or a power take off location for other gear or wheeled generators. The ring is also a structural support. The propeller 108 is encased in the rotor ring 104 and has no shaft, no hub and no nacelle, providing greater safety and a lighter structure. The rotatable propeller blades 108 are spanned under tension from the rim of the rotor ring 104 to a central tension ring 110 and then through the opposing blade 108 to the opposing side of the rotor ring 104. The tips of the propeller blades 104 are attached to evenly distributed sections of the rotor near the propeller tips or all around the perimeter with permanent magnets 142 on the underside that travel over the venturi shroud's circular rail on the rim embedded with coils 140 on the stator portion.

The preferred embodiment has a "stator" portion 139 of the maglev bearing generator embedded around the front rim of the venturi shroud 102, and the "rotor" portion 141 carries the permanent magnets 142 around the back face of the ring 104 encasing the propeller 108, which is suspended over the magnetic field induced by the rotor's magnets 142 as they move over the coils 140 on the "stator." The venturi shroud 102 provides a structural backing support for the rotor and a structural support for the whole system by means of the central split "clam" jacket 106 which carries the loads to the central column or tubular structure 112 to the ground 124. Conversely, there could be additional structures or towers 120 with rollers 122 supporting the sides and back of the venturi shroud 102 when necessary.

The propeller 108 is encased in a half torus shaped shroud ring 104 located about the rim of the turbine 100, which also contains the rotor portion 141 of a ring generator and magnetic bearing. This combination of features provides a lighter turbine and a shaftless propeller with blades attached at both ends, which are lighter and safer than conventional blades because they are under tension, similar to sails, and are enclosed in the ring 104.

The present invention therefore provides a hydro/aero-electric turbine 100 comprising a stator 139 and a rotor 141 which rotates over the stator 139. The rotor magnets 142 and the stator coils 140 are arranged in such a way as to generate radial and axial reactive forces in multiple opposing directions in a radial and axial manner. The magnetic bearing comprises rotor magnets 142 mounted to the rotor in substantially annular "Halbach arrays" and stator coils 140 mounted to the stator in opposing alignment to the rotor magnets 142 such as to generate an axial and radial reactive forces about the circumference of the rotor, the stator coils 140 being radially offset with respect to the rotor magnets 142 in at least one location on the stator so as to generate a radial reactive force.

A Halbach Array of magnets is a specific order of permanent magnets set in such a way that the magnetic field of this set of magnets is doubled in one face and cancelled on the other side.

The permanent magnets 142 are disposed about a rim of the rotor which levitates over the stator coils 140 on the flanged ring 138 disposed about a rim of the stator, which are embedded about the rim of the stationary portion of the "venturi ring."

The stator coils 140 are arranged in an opposed substantially annular array defining an annular flange 138 axially perpendicular to the stator and in which the coils 140 are arranged on both, the inside and the outside surfaces of the flange 138.

The rotor magnets 142 are arranged in a pair of opposed substantially annular arrays defining an annular channel 146 axially perpendicular to the stator face which slips over the flange 138 on the stator, where the coils 140 are disposed.

The stator comprises a flange 138 extending axially outward from the rim of the venturi shroud 102, comprising the annular surface where the coils 140 are arranged on each face of the flange 138, like a giant cookie cutter, which provide the magnetic supporting field in multiple axes when the rotor's magnets 142 move over the coils 140. The coils 140 may be set on the rim of the stator and on the flange 138, so the magnetic field induces an electrical current and a magnetic field that opposes the magnetic field of the permanent magnets 142 and create a levitating body. The ring generator becomes a magnetic levitating bearing and a generator in one unit simultaneously.

The rotor comprises the front part of the "venturi ring" and contains a shaftless propeller encased in a fluid-dynamically improved ring.

The hydro/aero electric turbine contains mechanical thrust bearings that are arranged and/or dimensioned so as to be load bearing only beyond a predefined axial and radial displacement of the rotor relative to the stator to supply mechanical support until a transitional speed is attained to provide magnetic levitation. The mechanical thrust bearings may be arranged and/or dimensioned to prevent contact between the stator coils and rotor magnets. The magnetic bearing is at least partially contained or embedded within the "stator" and the "rotor".

The annular venturi shroud 102 may contain the stator portion 139 of the system and is also a rigid structural support. The venturi shroud 102 is split vertically in two halves 102a and 102b and attached to each side of a hinged split tubular jacket column 106. The split "clam" jacket 106 is a hinged vertically split tubular structure with a split venturi ring shroud attached to each half of the hinged column jacket which may contain sets of motorized rollers 126 and 128 attached to the interior surfaces of each half that may be operated to elevate and/or rotate the jacket to face the flow of the currents on hydro or aerodynamic turbines. The "clam" system may be positioned over an existing vertical structure 112. The turbine is attached to each half of the jacket 106 on the ground, it is then positioned over the vertical column and raised to operational height when ready.

Conversely, the rotor's disposition of permanent magnets may be distributed in sections of the rotor ring situated at the tip of each blade or around the whole perimeter. The use of a propeller without a shaft encased in a ring shaped maglev bearing located about the rim of the turbine provides the possibility of a much larger scale turbine than can be possible with a conventional propeller, because the weight of the turbine is structurally independent and supported from the back and sides and the center column; the propeller blades weigh a lot less, the propeller is suspended along the perimeter. The center of mass is lower so the structural loads are better distributed to the ground, making the movable system lighter and easier to maintain The turbine uses a magnetic bearing to provide support against axial and radial thrust on a rotor which has no central shaft, no nacelle and moves a gearless direct drive generator with a propeller with blades spanning between opposing sides to a central tension ring of the rotor ring under tension, with a tension ring in the middle.

The present invention describes a turbine with a propeller encased in a hydro/aero-dynamically improved "venturi ring" that accelerates the fluid through it and boosts power output. The venturi ring is a shroud with a narrow throat upstream and a wider, expanding throat downstream which creates a low pressure zone behind the system that increases circulation of the fluid through the propeller increasing the power output.

The venturi ring shroud 102 is a rigid structure split in two halves 102a and 102b which are attached to each side of a hinged split tubular jacket column 106. This enables the system to be transported in a folded manner and to be set and closed over a tubular column or tensed cable 112.

The split "clam" jacket and venturi ring shroud is a hinged, vertically split tubular structure with a split venturi ring shroud attached to each half of the hinged column jacket which may contain sets of motorized rollers attached to the interior surfaces of each half that can be operated to elevate and/or rotate the jacket to face the flow of the currents on hydro or aerodynamic turbines. The "clam" system is set over an existing vertical tubular structure. The stator/venturi shroud is attached to each half of the split jacket column, it is then positioned over the vertical column, closed over it, locked and raised to operational height when ready.

In the preferred embodiment, the "maglev ring generator-bearing" embedded around the perimeter of the venturi ring shroud consists of two rings with identical diameters, the stator embedded around the rim of the venturi shroud, which is stationary, relative to the rotor, and attached to the split clam jacket column, and the rotor, which rotates over the stator ring.

Permanent magnets 142 are placed in two configurations of "Halbach arrays" 144 on the "rotor," which move over and under the "stator," which contains a configuration of copper coils 140 around the perimeter of the venturi shroud 102.

When the rotor turns, levitation kicks in as it reaches the transition speed of approximately 3 to 5 km/h and it becomes a floating body, that is, the maglev bearing.

The open coils induce an electric current, the closed coils induce an electric current which in turn generates an electromagnetic field that repels the magnet arrays on the rotor and at approximately 3 to 5 km/h (transition speed) the rotor levitates. The greater the speed, the greater the field force—thus it is auto-adjustable. In other words, the combination of open and closed copper coils produce a levitating magnetic field and an electric current simultaneously, but may be adjusted on command. Thus, the maglev ring generator-bearing with variable input is provided.

In a preferred embodiment, the rotor encases a specially designed rail cars at each tip of the propeller blades, a section of the rotor's perimeter, which contain two arrays of permanent magnets in a Halbach configuration, one on the outside face of the stator coils and the other on the inside of the stator coils, in a double Halbach effect. This double configuration doubles the original Halbach array arrangement and doubles the force of the magnetic field on the coils, which may double the magnetic force or the power output with less rare earth permanent magnet material. The permanent magnets may cover the whole perimeter of the rotor or just sections of the arc where the tips of the blades are attached. The power output will change accordingly.

The system can be mounted on vertical cables as in suspension bridges (see FIG. 18, for example), on tubular columns or space frame structures as described in the following descriptions.

The basic system consisting of the split "clam" hinged jacket column 106 that supports the rigid venturi ring shroud 102 with the stator portion 139 with coils 140 embedded on the rim; and a rotor consisting of an inflatable ring made of a flexible membrane inflated with gas under pressure which would carry rail cars similar to roller coaster cars with groups of Halbach arrays of permanent magnets that would ride over the coils on the stator portion of the system. The split venturi ring turbine system has the venturi shroud as a backing and a supporting structure. The coils are set on the surface of the axially protruding ring extending perpendicularly from the stator's rim. The rotor's permanent magnets 142 ride over both faces of the protruding ring's coils, inducing electricity and magnetic fields as they pass over them, the double Halbach arrays 144, one on top of the coil embedded rail and another array under it will double the strength of the magnetic field so it doubles the power output.

Figure 18:
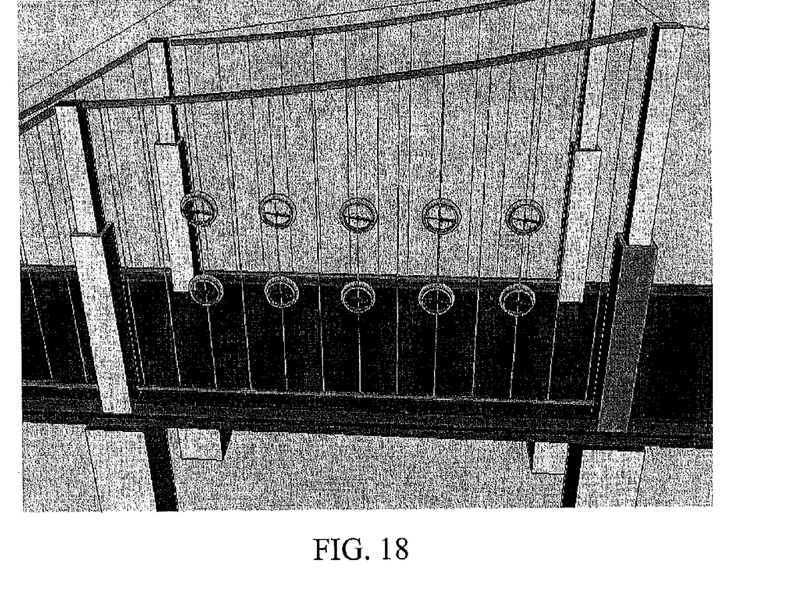
FIG. 18 shows an array of turbine assemblies according to an embodiment of the present invention, where the turbine assemblies are mounted on tension cables of a bridge.

The turbine system can be attached to cables hanging from overhead structures such as in suspension bridges as in FIG. 18.

Figure 6:
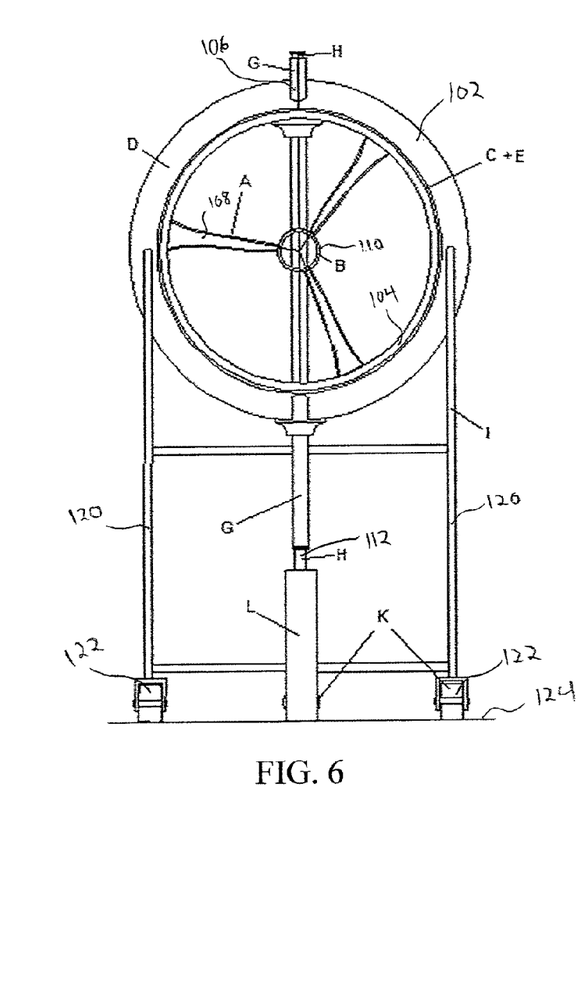
FIG. 6 shows a front view of a turbine assembly including a frame on rollers according to an embodiment of the present invention.
Figure 7:
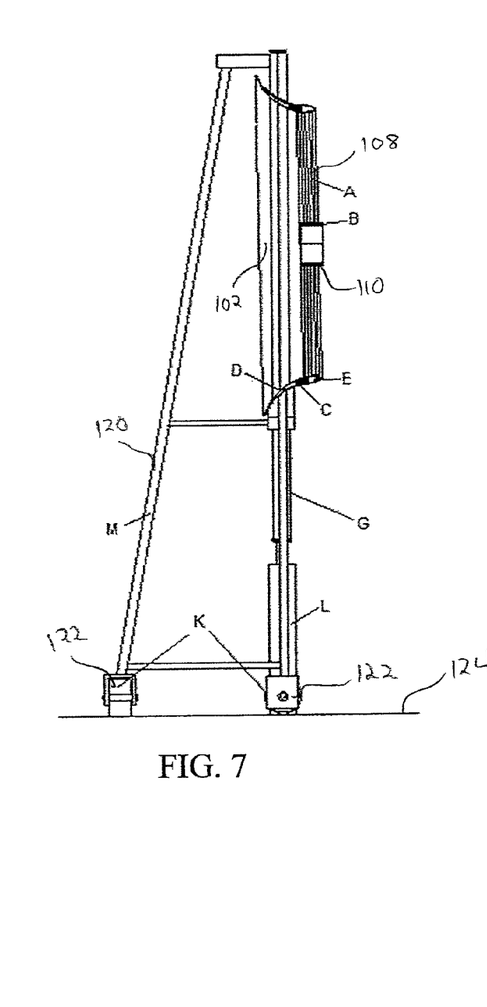
FIG. 7 shows a side view of a turbine assembly including a frame on rollers according to an embodiment of the present invention.
Figure 16:
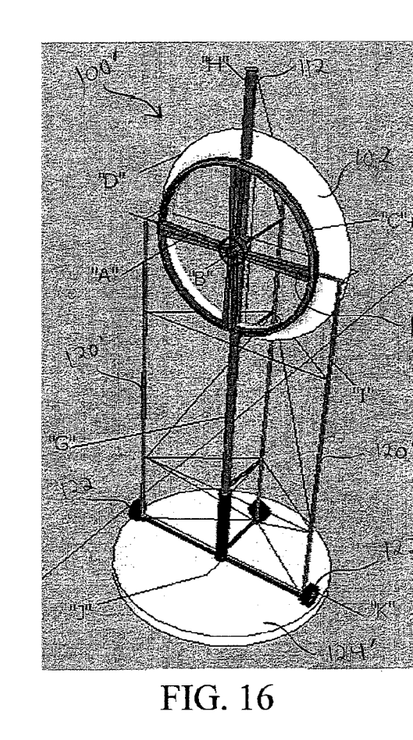
FIG. 16 shows an isometric view of a turbine assembly according to an embodiment of the present invention, with side and rear support structures mounted on rollers.
Figure 17:
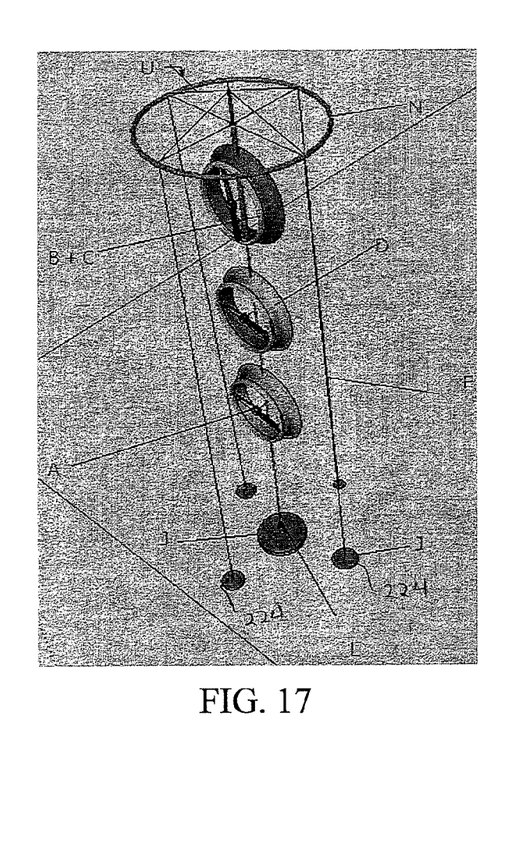
FIG. 17 shows an isometric view of a turbine assembly according to an embodiment of the present invention, with an upper support ring, slim central column, and surrounding tension cables.

The turbine system can be of grand scale, with tubular towers 120, 120' supporting either side and back of the venturi shroud 102 with motorized rollers 122 on the floor, to carry the structural loads and help rotate the system into the stream. See, for example, FIGS. 6, 7, and 16.

The turbine system can be of grand scale, set on a specially designed floating platform with tubular towers, similar to above but on a floating platform.

The systems can also be positioned in specially designed air foil blimps and lofted into the air, where wind velocities are greater and constant.

The systems can also be positioned under the water, where efficiency is greater.

The turbine system has the annular shroud around the propeller with a specially designed venturi effect accelerator, it is split in half vertically, and can fold open to attach to an existing vertical structure. The whole turbine can be assembled on the ground, set on the column and raised to operational height when ready. The rim of the "venturi ring" may have the magnetic bearing and ring generator embedded. The rotor portion of the system encases the propeller and moves over the magnetic field and rotates frictionless over the "stator" portion on the "venturi ring" shroud. The "split jacket column" gives the system a better supporting structure and better constructability.

The turbine system has the split ring generator around the perimeter of the rotor and has the stationary support behind it, it has no shaft, no gearbox and no nacelle.

The turbine system has an annular venturi effect shroud which is set separately over the venture shroud's rim, and which is split in two halves which boosts power and attached to a hinged split "clam" column that supports each half and completes the ring, it improves the structure, plus it makes transport, installation, maintenance and installation much easier.

The turbine system has the split ring generator around the perimeter of the rotor. The central split column allows the whole system to be assembled on the ground and raised when it's ready, may be folded for ease of transportation and is a structural support. The turbine system also has a venturi shroud around the stator's back for structural support and aerodynamic improvement or fluid circulation. The turbine blades are also able to rotate to adjust to wind forces to operate more efficiently. The variable input ring generator/maglev bearing of the turbine system operates more efficiently using double Halbach magnet arrays for levitation and generation.

The invention claimed is:

1. A turbine assembly comprising:
a split venturi shroud comprising two halves in hinged engagement about a vertical hinge axis that bisects said venturi shroud, said venturi shroud being a stator of said turbine assembly and being mountable on a support structure by being transitioned from a folded state to an unfolded state;
a split clam jacket comprising two halves each attached to one of said two halves of said venturi shroud such that said clam jacket is open when said venturi shroud is in said folded state and closed when said venturi shroud is in said unfolded state, at least a portion of said support structure being surrounded by said clam jacket when in said unfolded state; and
a rotor ring comprising an outer rim and a plurality of propeller blades within said outer rim, said rotor ring being a rotor of said turbine assembly,
wherein said rotor ring is configured to be mounted on said venturi shroud.

2. The turbine assembly according to claim 1, wherein said venturi shroud further comprises a plurality of coils, and
wherein said rotor ring further comprises a plurality of permanent magnets.

3. The turbine assembly according to claim 2, wherein said plurality of coils defines an annular flange extending from a rotor-ring-mounting side of said venturi shroud.

4. The turbine assembly according to claim 3, wherein said plurality of permanent magnets forms an annular double Halbach array configured to receive said annular flange in an annular channel defined by said double Halbach array.

5. The turbine assembly according to claim 4, wherein a first set of said plurality of coils comprises a radially outward face of said annular flange and a second set of said plurality of coil comprises a radially inward face of said annular flange, and
wherein a first Halbach array of said double Halbach array faces said first set of said plurality of coils, and a second Halbach array of said double Halbach array face said second set of said plurality of coils.

6. The turbine assembly according to claim 2, wherein, above a transition speed of said rotor ring, said plurality of permanent magnets levitate said rotor ring over said plurality of coils.

7. The turbine assembly according to claim 6, wherein said transition speed is about 3 to 5 km/h.

8. The turbine assembly according to claim 2, wherein said plurality of coils comprises a plurality of switches that connect bridges between sets of coils of said plurality of coils, and
wherein said plurality of switches are controllable between an open state and a closed state to regulate at least one of power, voltage, and magnetic fields of said turbine assembly.

9. The turbine assembly according to claim 8, wherein said plurality of switches are controllable to operate said plurality of coils in at least one of a levitator mode and a generator mode, and
wherein a combination of switches in said open state and switches in said closed state operates said plurality of coils in said levitator mode and said generator mode simultaneously.

10. The turbine assembly according to claim 1, wherein said support structure is a tubular column or a tensed cable.

11. The turbine assembly according to claim 1, wherein said clam jacket includes a plurality of motorized rollers on one or more interior surface of said two halves of said clam jacket, and
wherein said plurality of motorized rollers are configured to adjust at least one of an elevation and a rotation of said turbine assembly relative to said support structure.

12. The turbine assembly according to claim 11, wherein said adjusting of at least one of said elevation and said rotation is based on a flow direction of a fluid with respect to said turbine assembly.

13. The turbine assembly according to claim 1, wherein said rotor ring further comprises a tension ring in a center of said rotor ring, said plurality of propeller blades mounted in tension between said tension ring and said outer rim of said rotor ring.

14. The turbine assembly according to claim 1, further comprising at least one additional support structure including an upper end coupled to said venturi shroud and a lower end extending to a surface that supports said turbine assembly.

15. The turbine assembly according to claim 14, wherein one or more of said at least one additional support structure comprises a motorized wheel at said lower end, said motorized wheel being configured to rotate said turbine assembly based on a flow direction of a fluid with respect to said turbine assembly.

16. The turbine assembly according to claim 1, wherein said rotor ring forms a ring generator with said venturi shroud.

17. The turbine assembly according to claim 1, wherein said rotor ring forms a maglev bearing with said venturi shroud.

18. A method mounting a turbine assembly on a support structure, comprising:

supplying a split venturi shroud that is folded at a hinge connecting two halves of said venturi shroud, said venturi shroud comprising a stator ring and a split clam jacket that comprises two halves that are each attached to a mating face of one of said two halves of said venturi shroud, the clam jacket being open when said venturi shroud is folded;

positioning said venturi shroud such that said clam jacket is substantially parallel and proximal to said support structure;

unfolding said venturi shroud such that said claim jacket closes around said support structure; and mounting a rotor ring on said venturi shroud, said rotor ring having a rotor portion.

* * * * *